US012753076B2

(12) United States Patent
Tahara et al.

(10) Patent No.: US 12,753,076 B2
(45) Date of Patent: Oct. 6, 2026

(54) BORON NITRIDE POWDER, METHOD OF MANUFACTURING BORON NITRIDE POWDER, RESIN MATERIAL, AND METHOD OF MANUFACTURING RESIN MATERIAL

(71) Applicant: JFE STEEL CORPORATION, Tokyo (JP)

(72) Inventors: Daisuke Tahara, Tokyo (JP); Hiroyuki Masuoka, Tokyo (JP); Akira Matsuzaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1218 days.

(21) Appl. No.: 17/754,370

(22) PCT Filed: Sep. 29, 2020

(86) PCT No.: PCT/JP2020/037010
§ 371 (c)(1),
(2) Date: Mar. 31, 2022

(87) PCT Pub. No.: WO2021/070690
PCT Pub. Date: Apr. 15, 2021

(65) Prior Publication Data

US 2022/0380213 A1 Dec. 1, 2022

(30) Foreign Application Priority Data

Oct. 7, 2019 (JP) ................................ 2019-184692

(51) Int. Cl.
*C01B 21/064* (2006.01)
*C08K 3/38* (2006.01)

(52) U.S. Cl.
CPC ............ *C01B 21/0648* (2013.01); *C08K 3/38* (2013.01)

(58) Field of Classification Search
CPC .............................. C01B 21/0648; C08K 3/38
See application file for complete search history.

(56) References Cited

U.S. PATENT DOCUMENTS

| | | | |
|---|---|---|---|
| 7,527,859 | B2 | 5/2009 | Zhong et al. |
| 8,703,023 | B2 | 4/2014 | Sainsbury et al. |
| 2007/0054122 | A1 | 3/2007 | Paisner et al. |
| 2010/0051879 | A1 | 3/2010 | Sainsbury et al. |
| 2012/0273733 | A1 | 11/2012 | Sainsbury et al. |
| 2016/0348306 | A1 | 12/2016 | Van Rooij |

FOREIGN PATENT DOCUMENTS

| | | | |
|---|---|---|---|
| CN | 101003696 | A | 7/2007 |
| CN | 104379010 | A | 2/2015 |
| CN | 107163290 | A | 9/2017 |
| JP | H0912771 | A | 1/1997 |
| JP | 2008094701 | A | 4/2008 |
| JP | 2010510168 | A | 4/2010 |
| JP | 2012121744 | A | 6/2012 |
| JP | 2015188420 | A | 11/2015 |
| JP | 2018159062 | A | 10/2018 |

OTHER PUBLICATIONS

Jan. 30, 2024, Office Action issued by the Korean Intellectual Property Office in the corresponding Korean Patent Application No. 10-2022-7008208 with English language concise statement of relevance.
Apr. 26, 2023, Office Action issued by the China National Intellectual Property Administration in the corresponding Chinese Patent Application No. 202080066950.8 with English language search report.
Mar. 8, 2022, Notification of Reasons for Refusal issued by the Japan Patent Office in the corresponding Japanese Patent Application No. 2021-507872 with English language concise statement of relevance.
Dec. 1, 2020, International Search Report issued in the International Patent Application No. PCT/JP2020/037010.
Jul. 6, 2021, Office Action issued by the Taiwan Intellectual Property Office in the corresponding Taiwanese Patent Application No. 109134334 with English language Concise Statement of Relevance.
Dec. 2, 2022, Office Action issued by the Canadian Intellectual Property Office in the corresponding Canadian Patent Application No. 3,145,280.
Feb. 25, 2025, Communication pursuant to Article 94(3) EPC issued by the European Patent Office in the corresponding European Patent Application No. 20874248.6.
Feb. 3, 2023, the Extended European Search Report issued by the European Patent Office in the corresponding European Patent Application No. 20874248.6.
Kiujuan J Dai et al., Controlled surface modification of boron nitride nanotubes, Nanotechnology, 2011, vol. 22.

*Primary Examiner* — James A Fiorito
(74) *Attorney, Agent, or Firm* — KENJA IP LAW PC

(57) ABSTRACT

Provided is a boron nitride powder having excellent adhesion to a resin. The boron nitride powder has a hexagonal structure, has a carboxyl group present on a surface of the boron nitride powder, and has a molar ratio of carboxyl group to nitrogen atom of 0.001 or more on a surface of the boron nitride powder.

8 Claims, No Drawings

BORON NITRIDE POWDER, METHOD OF MANUFACTURING BORON NITRIDE POWDER, RESIN MATERIAL, AND METHOD OF MANUFACTURING RESIN MATERIAL

TECHNICAL FIELD

This disclosure relates to a boron nitride powder, and in particular to a boron nitride powder which can be used at a high filling rate and which can be used to manufacture a resin material with excellent thermal (heat) conductivity. This disclosure also relates to a method of manufacturing the boron nitride powder, a resin material containing the boron nitride powder, and a method of manufacturing a resin material.

BACKGROUND

In recent years, miniaturization of electronic devices has caused an increase in energy density and thus an increase in the amount of heat generated per unit volume. Therefore, there is a strong demand for insulating materials used in electronic devices to have high heat dissipation properties.

Resins such as epoxy resins are widely used in the insulating materials because of their high insulation withstand voltage and ease of forming. However, the thermal conductivity of a resin is low, so that the desired heat dissipation properties cannot be obtained with a resin alone. Therefore, inorganic fillers with high thermal conductivity and insulating properties are generally added to the resin to obtain high thermal conductivity. Examples of the inorganic filler include hexagonal boron nitride powder and aluminum nitride powder.

Among the above, hexagonal boron nitride is widely used as a thermally conductive filler added to insulating materials because of its excellent thermal conductivity. However, hexagonal boron nitride has a problem of poor adhesion (affinity) to a resin.

The mix proportion (filling rate) of the filler should be increased to improve the thermal conductivity. However, since the hexagonal boron nitride has poor adhesion to a resin, increasing the filling rate causes formation of voids in a resin material, which in turn deteriorates the thermal conductivity. In addition, when the filling rate is increased, it is difficult to manufacture a resin material due to poor adhesion.

To solve this problem, a technology has been proposed to improve the adhesion (affinity) between a resin, which is a matrix, and a boron nitride powder, which is an inorganic filler.

For example, JP H09-012771 A (PTL 1) proposes a technology for heating a boron nitride powder in an oxidizing atmosphere such as in oxygen or in air.

In addition, JP 2012-121744 A (PTL 2) proposes a technology for oxidizing a boron nitride powder with supercritical water or subcritical water, and optionally adsorbing/binding an organic modifier to a hydroxyl group formed by the oxidation.

JP 2008-094701 A (PTL 3) proposes a technology for reducing the viscosity of a boron nitride-containing resin composition by modifying the surface of boron nitride with an organosilicon compound.

CITATION LIST

Patent Literature

PTL 1: JP H09-012771 A
PTL 2: JP 2012-121744 A
PTL 3: JP 2008-094701 A

SUMMARY

Technical Problem

In recent years, the amount of heat generated per unit volume has been further increased due to further miniaturization of electronic devices, and the insulating materials that constitute electronic devices are required to have even higher heat dissipation properties. However, with the conventional technologies including those described in the above-mentioned PTLS 1 to 3, it is difficult to obtain a resin material having excellent thermal conductivity to meet the demand for even higher heat dissipation properties.

It could thus be helpful to provide a boron nitride powder which can be used at a high filling rate and which can be used to manufacture a resin material with excellent thermal conductivity. It could also be helpful to provide a resin material containing the boron nitride powder.

Solution to Problem

We thus provide the following.

1. A boron nitride powder, wherein
   the boron nitride powder has a hexagonal structure,
   the boron nitride powder has a carboxyl group present on a surface of the boron nitride powder, and
   the boron nitride powder has a molar ratio of carboxyl group to nitrogen atom of 0.001 or more on a surface of the boron nitride powder.
2. The boron nitride powder according to 1., wherein the molar ratio of carboxyl group to nitrogen atom on a surface of the boron nitride powder is 0.005 or more.
3. A method of manufacturing a boron nitride powder, which is a method of manufacturing the boron nitride powder according to 1. or 2., comprising
   subjecting a boron nitride powder having a hexagonal structure to a plasma treatment in an atmosphere containing either or both of $CO_2$ and CO in a total of 5 vol % or more and under a pressure of 1 Pa or more and 100 Pa or less.
4. A resin material, comprising
   the boron nitride powder according to 1. or 2., and
   at least one resin selected from the group consisting of an epoxy resin, a silicone resin, a urethane resin, and an isocyanate resin.
5. A method of manufacturing a resin material, comprising
   manufacturing a boron nitride powder with the method of manufacturing a boron nitride powder according to 3., and
   mixing the boron nitride powder with at least one resin selected from the group consisting of an epoxy resin, a silicone resin, a urethane resin, and an isocyanate resin to form a resin material.

Advantageous Effect

The boron nitride powder of the present disclosure has excellent adhesion (affinity) to a resin, so that the filling rate can be increased. Even if the boron nitride powder is mixed with a resin at a high filling rate, the thermal conductivity will not be deteriorated due to an increase in voids. Therefore, the boron nitride powder of the present disclosure can be used very suitably as a thermally conductive filler to be added to a resin material. Further, according to the manufacturing method of the present disclosure, it is possible to efficiently manufacture a boron nitride powder having the above-described properties. The resin material containing the boron nitride powder of the present disclosure can be very suitably used as an insulating material for electronic devices that require heat dissipation properties, such as a thermally conductive insulation sheet.

DETAILED DESCRIPTION

The following provides details of a method of carrying out the present disclosure. The following merely provides preferred embodiments of the present disclosure, and the present disclosure is by no means limited to the disclosed embodiments.

[Boron Nitride Powder]

A boron nitride powder in one embodiment of the present disclosure is a powder of boron nitride having a hexagonal structure (hexagonal boron nitride, h-BN). Hexagonal boron nitride is a material with a layered structure similar to graphite, which has excellent thermal conductivity.

(Molar Ratio)

In the present disclosure, it is important that a molar ratio of carboxyl group to nitrogen atom on a surface of the boron nitride powder is 0.001 or more.

The carboxyl group (—COOH) is a kind of polar group, and by forming hydrogen bonds, it improves the adhesion (affinity) between a boron nitride powder and a resin. Therefore, when the molar ratio is 0.001 or more, the affinity of the boron nitride powder to a resin is sufficiently increased, and high thermal conductivity can be obtained. Thus, the molar ratio is set to 0.001 or more and preferably 0.005 or more. On the other hand, the adhesion between the boron nitride powder and a resin increases as the molar ratio increases, and therefore the upper limit of the molar ratio is not particularly limited. However, the molar ratio usually may be 0.100 or less and may be 0.050 or less. It may also be 0.025 or less.

The molar ratio can be analyzed by X-ray photoelectron spectroscopy (XPS) using a chemical modification method. Specifically, it is measured with the method described in the EXAMPLES section.

The shape of boron nitride particles of the boron nitride powder is not particularly limited, but it is preferably a scaly shape.

The boron nitride powder of the present disclosure preferably has an agglomerated structure in which boron nitride particles as primary particles are agglomerated to form secondary particles. A boron nitride powder having an agglomerate structure has a smaller specific surface area than a boron nitride powder without an agglomerate structure. Therefore, by using a boron nitride powder having an agglomerate structure, the contact area between the boron nitride powder and a resin when they are mixed is reduced, which lowers the viscosity of a resin composition. Thus, when the boron nitride powder has an agglomerate structure, it is easier to manufacture a resin material.

A boron nitride powder having an agglomerate structure can exhibit high thermal conductivity in all directions, regardless of the shape of the primary particles. The reason is as follows. That is, when the primary particles of boron nitride are in a scaly shape, the primary particles exhibit anisotropy in thermal conductivity. Specifically, the scaly particles have high thermal conductivity in the plane direction, but the thermal conductivity in the direction perpendicular to the plane is much lower than that in the plane direction. When a boron nitride powder whose primary particles are in a scaly shape is used as a filler of an insulating material, the scaly particles are oriented in the plane direction in a process of forming the insulating material. Therefore, even if the filling rate of the boron nitride powder is increased, the thermal conductivity in the direction perpendicular to the plane cannot be improved. For example, in a case of manufacturing a sheet of insulating material, the thermal conductivity in the plane direction of the sheet is excellent, but the thermal conductivity in the thickness direction is poor. On the other hand, the boron nitride powder with an agglomerate structure contains primary particles oriented in various directions, so it can exhibit higher thermal conductivity in all directions without being affected by the anisotropy of the primary particles.

(Major Axis Length of Primary Particle)

The major axis length of the particles (primary particle) of the boron nitride powder is preferably 1 μm or more. When the major axis length is 1 μm or more, the agglomerate structure described above is easily formed. On the other hand, the major axis length of the primary particles is preferably 10 μm or less. When the major axis length is 10 μm or less, long-time and high-temperature heating is not required during manufacturing, which renders the manufacture easy.

The major axis length of the primary particles can be measured using a scanning electron microscope (SEM). Specifically, a secondary electron image is captured at an accelerating voltage of 1 kV, and the size of a scaly boron nitride particle with the largest area in one agglomerate is defined as the major axis length. Note that the major axis length is the length in the SEM image.

(Median Size of Secondary Particle)

When the boron nitride powder has an agglomerate structure, the median size of the secondary particles is preferably 20 μm or more. When the median size of the secondary particles is 20 μm or more, the specific surface area is small, and an increase in viscosity can be suppressed when mixed with a resin, which renders it easy to form a resin material. On the other hand, the median size of the secondary particles is preferably 150 μm or less. When the median size of the secondary particles is 150 μm or less, long-time and high-temperature heating is not required during manufacturing, which renders the manufacture easy.

In the present disclosure, the median size of the secondary particles refers to the median size D50 in the particle size distribution (cumulative distribution) on a volume basis measured by a laser diffraction particle size distribution measuring device. More specifically, the median size of the secondary particles can be determined from the particle size distribution on a volume basis measured at a discharge pressure of 0.01 MPa using a laser diffraction particle size distribution measuring device (Malvern Panalytical: MASTERSIZER 3000).

[Manufacturing Method]

Next, a method of manufacturing a boron nitride powder in another embodiment of the present disclosure will be described. Although not particularly limited, the boron nitride powder of the present disclosure can be manufactured by subjecting a boron nitride powder having a hexagonal structure to a plasma treatment under the specific conditions described below.

(Plasma Treatment Atmosphere)

It is necessary to perform the plasma treatment in an atmosphere containing either or both of $CO_2$ (carbon dioxide) and CO (carbon monoxide) in a total of 5 vol % or more. By performing the plasma treatment in an atmosphere containing either or both of $CO_2$ and CO, the affinity of the boron nitride powder to a resin can be improved. This is because the plasma treatment under the above conditions forms a carboxyl group (—COOH) having high affinity to a resin on the surface of the boron nitride powder.

However, when the total concentration of $CO_2$ and CO in the atmosphere is less than 5 vol %, the molar ratio of carboxyl group to nitrogen atom on the surface of the boron nitride powder cannot be sufficiently increased, and the affinity to a resin cannot be sufficiently improved. Therefore, the total concentration is set to 5 vol % or more. On the other hand, the upper limit of the total concentration is not particularly limited, and the total concentration may be 100 vol % or less. From the viewpoint of ease of handling, the total concentration is preferably 100 vol %.

Further, from the viewpoint of ease of handling and safety, it is preferable to use an atmosphere containing $CO_2$ but no CO, and it is more preferable to use an atmosphere composed of $CO_2$, that is, an atmosphere of 100 vol % of $CO_2$.

The atmosphere may contain a gas other than $CO_2$ and CO. The gas other than the above-described $CO_2$ and CO is not particularly limited, and it may be at least one selected from the group consisting of rare gases such as Ar, He and Ne, and $N_2$, for example.

When the pressure of the atmosphere at which the plasma treatment is performed is less than 1 Pa, the molar ratio of carboxyl group to nitrogen atom on the surface of the boron nitride powder cannot be sufficiently increased. Therefore, the pressure of the atmosphere is 1 Pa or more and preferably 5 Pa or more. On the other hand, when the pressure exceeds 100 Pa, collision of gas molecules tends to occur. As a result, the molar ratio of carboxyl group to nitrogen atom cannot be sufficiently increased. Therefore, the pressure is 100 Pa or less, preferably 50 Pa or less, and more preferably 30 Pa or less.

The energy of the plasma treatment is not particularly limited. However, when the energy is 50 W or more, the carboxyl group can be introduced more effectively. This is because, when the plasma treatment is performed with energy of 50 W or more, the covalent bond of boron nitride is broken, and the reactivity with $CO_2$ and CO in the atmosphere is improved. Therefore, the energy of the plasma treatment is preferably 50 W or more. On the other hand, when the energy of the plasma treatment is more than 10000 W, the agglomerate structure of the boron nitride powder may be destroyed. Therefore, the energy of the plasma treatment is preferably 10000 W or less.

[Resin Material]

A resin material of one embodiment of the present disclosure includes the boron nitride powder described above and at least one resin selected from the group consisting of an epoxy resin, a silicone resin, and an isocyanate resin. The resin material can be suitably used in the manufacture of insulating materials for electronic devices and the like.

The content rate of the boron nitride powder in the resin material is not particularly limited, and the boron nitride powder can be contained at any rate. However, when the rate exceeds 80 vol % as a percentage of the total solid content of the resin material, it is difficult to form a resin material, and when the rate is 50 vol % or less, the thermal conductivity is reduced. Therefore, the content rate of the boron nitride powder in the resin material is preferably 50 vol % or more and 80 vol % or less as a percentage of the total solid content of the resin material.

The resin material may optionally further contain a curing agent. Any curing agent may be used without any particular limitation.

In one embodiment of the present disclosure, a method of manufacturing the resin material includes manufacturing a boron nitride powder with the above-described manufacturing method, and mixing the boron nitride powder with at least one resin selected from the group consisting of an epoxy resin, a silicone resin, a urethane resin, and an isocyanate resin to form a resin material. The resin material manufactured with the above-described method is an insulating material having excellent thermal conductivity, which can be suitably used as an insulating material for electronic devices and the like.

In the above-described manufacturing method, a curing agent can optionally be mixed in addition to the boron nitride powder and the resin. Any curing agent may be used without any particular limitation.

EXAMPLES

A boron nitride powder was produced by subjecting a boron nitride powder (hereinafter referred to as "raw boron nitride powder"), which was a starting material, to a plasma treatment under the conditions described below.

(Raw Boron Nitride Powder)

The raw boron nitride powder was HP4OMF100 (Mizushima Ferroalloy Co., Ltd.). The HP4OMF100 is a boron nitride powder having an agglomerate structure in which scaly primary particles of hexagonal boron nitride aggregate to form secondary particles, where the major axis length of the primary particles is 10 μm, and the median size of the secondary particles is 40 μm.

(Plasma Treatment)

The raw boron nitride powder was subjected to a plasma treatment under the conditions listed in Table 1. The plasma treatment was performed by feeding 20 g of the raw boron nitride powder into a plasma irradiation device (manufactured by Stec Co., Ltd.). For comparison, the plasma treatment was not performed in some examples (Comparative Example B1).

(Molar Ratio)

The molar ratio of carboxyl group to nitrogen atom on the surface of the obtained boron nitride powder was evaluated by X-ray photoelectron spectroscopy (XPS) using a chemical modification method. The chemical modification method is a technique that enables the detection of functional group by using a reagent that reacts selectively with a functional group to be analyzed and measuring the elements contained in the reagent. In this case, trifluoroethanol, which is a reagent that reacts selectively with a carboxyl group, was used. The specific measurement procedure is described below.

The boron nitride powder to be evaluated was fixed in an aluminum cup using a hand press, and trifluoroethanol ($CF_3CH_2OH$) was reacted with a carboxyl group (R—COOH) in the gas phase (under reduced pressure) ($R{-}COOH+CF_3CH_2OH \rightarrow R{-}COOCH_2CF_3$). The boron nitride powder was then introduced into an X-ray photoelectron spectroscopy (XPS) measurement system, and measurements were performed. Fluorine atoms added by the above reaction and nitrogen atoms in the boron nitride were detected as peaks near the binding energies of 689 eV and 398 eV by X-ray photoelectron spectroscopy using monochrome AlKα rays as the X-ray source and with the photoelectron extraction angle at 45 degrees. In this way, the elemental ratio of fluorine atom and nitrogen atom was calculated from the areas of the detected peaks and sensitivity coefficients. Trifluoroethanol ($CF_3CH_2OH$) contains three fluorine atoms, so that the amount of carboxyl group can be determined as one-third of the elemental ratio of fluorine atoms. From this value, the molar ratio of carboxyl group to nitrogen atom was determined. The measurement results are listed in Table 1.

(Preparation and Evaluation of Heat Dissipation Sheet)

Bisphenol F epoxy resin ("jER807" manufactured by Mitsubishi Chemical Corporation), the above-described boron nitride powder, methyl cellosolve as a solvent, and a modified alicyclic amine curing agent ("jER Cure 113" manufactured by Mitsubishi Chemical Corporation) were added and mixed in the ratio listed in Table 2. The filling rate of the boron nitride powder in the resin material of each example was 70 vol %. As used herein, the filling rate of boron nitride is the ratio of the boron nitride powder to the total solid content of the resin material, which was obtained by calculating the volume from the mass of the mixed epoxy resin, curing agent and boron nitride, and calculating the filling rate by the following formula as the ratio of boron nitride in the total volume.

Filling rate (vol %)=(volume of BN)/(volume of BN+volume of epoxy resin+volume of curing agent)

The following values of density were used in the above calculation.

Boron nitride powder: 2.26 g/cm$^3$
Epoxy resin: 1.20 g/cm$^3$
Curing agent: 0.945 g/cm$^3$ Next, it was kneaded for two minutes at room temperature using a self-rotating and revolving mixer (THINKY: ARV-310) and then applied to a polyimide film using a hand coater so that the thickness after forming was 200 μm. It was dried and then subjected to thermal press forming (170° C., 80 kgf·cm$^2$) to obtain a resin material.

(Thermal Conductivity)

The thermal conductivity of the obtained resin material was determined as follows. The thermal diffusivity was determined using a laser-flash-technique thermal constant measurement device (ADVANCE RIKO, Inc.: TC-3000), the density was determined with the Archimedes method, the specific heat was determined with the differential scanning calorimetry (DSC) method, and the thermal conductivity in the thickness direction was determined by multiplying these values. The evaluation results are listed in Table 1.

As indicated in Table 1, the resin material containing a boron nitride powder satisfying the conditions of the present disclosure showed excellent thermal conductivity. On the other hand, the comparative example using a boron nitride powder that did not meet the conditions of the present disclosure had poor thermal conductivity.

TABLE 1

| | Conditions of plasma treatment | | | | | |
|---|---|---|---|---|---|---|
| No. | Gas composition (vol %) | Pressure (Pa) | Time of treatment (min) | Molar ratio of carboxyl group to nitrogen atom | Thermal conductivity (W/m · k) | Remarks |
| A1 | 100% $CO_2$ | 10 | 5 | 0.008 | 17.2 | Example |
| A2 | 100% $CO_2$ | 10 | 20 | 0.022 | 17.3 | Example |
| A3 | 100% $CO_2$ | 10 | 40 | 0.045 | 19.7 | Example |
| A4 | 100% $CO_2$ | 15 | 5 | 0.010 | 17.0 | Example |
| A5 | 100% $CO_2$ | 25 | 5 | 0.007 | 16.7 | Example |
| A6 | 20% $CO_2$ + 80% Ar | 10 | 5 | 0.005 | 16.5 | Example |
| A7 | 100% CO | 10 | 5 | 0.006 | 16.7 | Example |
| B1 | — | | | 0 | 15.0 | Comparative Example |

TABLE 2

| Component | Ratio |
|---|---|
| Methyl cellosolve | 100.0 parts by mass |
| Bisphenol F epoxy resin | 20.6 parts by mass |
| Boron nitride powder | 123.5 parts by mass |
| Modified alicyclic amine curing agent | 5.9 parts by mass |

The invention claimed is:

1. A boron nitride powder, wherein the boron nitride powder has a hexagonal structure, a major axis length of particles of the boron nitride powder is 1 μm or more, the boron nitride powder has a carboxyl group present on a surface of the boron nitride powder, and the boron nitride powder has a molar ratio of carboxyl group to nitrogen atom of 0.001 or more on a surface of the boron nitride powder.

2. The boron nitride powder according to claim 1, wherein the molar ratio of carboxyl group to nitrogen atom on a surface of the boron nitride powder is 0.005 or more.

3. A method of manufacturing a boron nitride powder, which is a method of manufacturing the boron nitride powder according to claim 1, comprising subjecting a boron nitride powder having a hexagonal structure to a plasma treatment in an atmosphere containing either or both of $CO_2$ and CO in a total of 5 vol % or more and under a pressure of 1 Pa or more and 100 Pa or less.

4. A resin material, comprising the boron nitride powder according to claim 1, and at least one resin selected from the group consisting of an epoxy resin, a silicone resin, a urethane resin, and an isocyanate resin.

5. A method of manufacturing a resin material, comprising manufacturing a boron nitride powder with the method of manufacturing a boron nitride powder according to claim 3, and mixing the boron nitride powder with at least one resin selected from the group consisting of an epoxy resin, a silicone resin, a urethane resin, and an isocyanate resin to form a resin material.

6. A method of manufacturing a boron nitride powder, which is a method of manufacturing the boron nitride powder according to claim 2, comprising subjecting a boron nitride powder having a hexagonal structure to a plasma treatment in an atmosphere containing either or both of $CO_2$ and CO in a total of 5 vol % or more and under a pressure of 1 Pa or more and 100 Pa or less.

7. A resin material, comprising the boron nitride powder according to claim 2, and at least one resin selected from the group consisting of an epoxy resin, a silicone resin, a urethane resin, and an isocyanate resin.

8. The boron nitride powder according to claim 1, wherein the boron nitride powder has an agglomerated structure in which boron nitride particles as primary particles are agglomerated to form secondary particles, and a median size of the secondary particles is 20 μm or more.

* * * * *